United States Patent
Cooper

(10) Patent No.: US 9,262,542 B2
(45) Date of Patent: *Feb. 16, 2016

(54) SYSTEM AND METHOD FOR PROVIDING LOCATION INFORMATION FOR COMMUNICATIONS THROUGH AN ACCESS NETWORK

(71) Applicant: Unwired Planet, LLC, Reno, NV (US)

(72) Inventor: William T. Cooper, Henderson, CO (US)

(73) Assignee: Unwired Planet, LLC, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/322,732

(22) Filed: Jul. 2, 2014

(65) Prior Publication Data

US 2014/0317102 A1    Oct. 23, 2014

Related U.S. Application Data

(63) Continuation of application No. 13/560,751, filed on Jul. 27, 2012, now Pat. No. 8,805,405.

(60) Provisional application No. 61/512,301, filed on Jul. 27, 2011.

(51) Int. Cl.

| | |
|---|---|
| *H04W 24/00* | (2009.01) |
| *G06F 17/30* | (2006.01) |
| *H04W 4/02* | (2009.01) |
| *H04W 4/12* | (2009.01) |
| *H04W 76/02* | (2009.01) |

(Continued)

(52) U.S. Cl.
CPC ....... *G06F 17/3087* (2013.01); *G06F 17/30241* (2013.01); *H04W 4/02* (2013.01); *H04W 4/12* (2013.01); *H04W 64/003* (2013.01); *H04W 76/021* (2013.01); *H04W 84/12* (2013.01)

(58) Field of Classification Search
CPC ....... H04W 4/025; H04W 4/02; H04W 84/12; H04W 88/08; H04W 4/12; H04W 64/003; H04W 76/021; H04W 84/105; H04W 84/14; H04W 84/16
USPC .......... 455/456.1, 456.2, 456.3, 456.4, 456.5, 455/412.1, 412.2, 414.2, 432.3, 445
See application file for complete search history.

(56) References Cited

U.S. PATENT DOCUMENTS

2002/0035605 A1    3/2002  McDowell et al.
2003/0034879 A1 *  2/2003  Rangarajan et al. ......... 340/7.56

(Continued)

FOREIGN PATENT DOCUMENTS

GB            2334412 A       8/1999

*Primary Examiner* — Jean Gelin

(57) ABSTRACT

A system and method for providing location information for communications through an access network in accordance with embodiments of the invention are disclosed. The system and method involve receiving a communication including a message from an origination device. The communication includes access point information and the message includes an identifier of the communication. The access point information from the communication is extracted and the access point information or geographic data based on the access point information is stored in a database. The message including the identifier is sent to a destination device of the message. The storing of the access point information or the geographic data in the database enables the destination device to obtain the access point information or the geographic data using the identifier included in the message by querying the database.

18 Claims, 5 Drawing Sheets

(51) Int. Cl.
*H04W 64/00* (2009.01)
*H04W 84/12* (2009.01)

(56) References Cited

U.S. PATENT DOCUMENTS

| | | | |
|---|---|---|---|
| 2006/0138219 A1* | 6/2006 | Brzezniak et al. | 235/383 |
| 2008/0045234 A1* | 2/2008 | Reed | 455/456.1 |
| 2008/0046366 A1* | 2/2008 | Bemmel et al. | 705/44 |
| 2008/0140479 A1* | 6/2008 | Mello et al. | 705/7 |
| 2009/0170525 A1 | 7/2009 | Baghdasaryan | |
| 2009/0275348 A1* | 11/2009 | Weinreich et al. | 455/456.3 |
| 2012/0142359 A1* | 6/2012 | Lewis et al. | 455/445 |
| 2012/0157062 A1* | 6/2012 | Kim et al. | 455/414.1 |

* cited by examiner

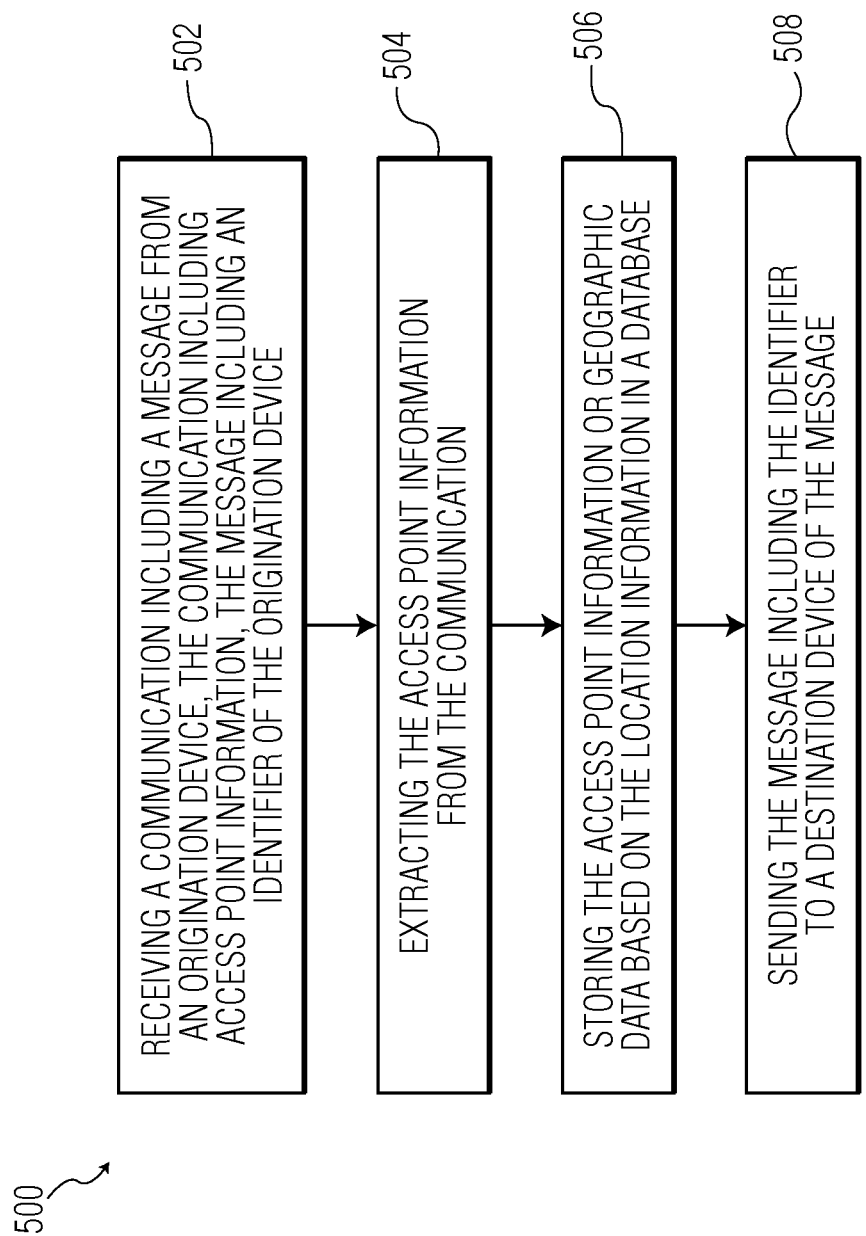

SYSTEM AND METHOD FOR PROVIDING LOCATION INFORMATION FOR COMMUNICATIONS THROUGH AN ACCESS NETWORK

CROSS REFERENCE TO RELATED APPLICATIONS

This application is a continuation of U.S. application Ser. No. 13/560,751, filed Jul. 27, 2012, now issued as U.S. Pat. No. 8,805,405, which claims the benefit of U.S. Provisional Patent Application Ser. No. 61/512,301, filed on Jul. 27, 2011, both of which are herein incorporated by reference.

BACKGROUND

In a wireless environment of an access network, text messages and other communications may be transmitted from a sender to a recipient through the access network. The text message may be in response to a promotional campaign and typically only includes the sender's ID and a text message body. Even though the access network is aware of an approximate location of the sender's device as determined by a Cell Global Identity (cell ID) of a base station to which the sender's device is connected, this location information is not transmitted to the recipient. In case of a promotional campaign, the recipient of the responses to the campaign has knowledge of the phone numbers that sent the responses, but the recipient cannot determine from what locations these responses were sent, unless the sender manually enters the location information in the body of the text message.

SUMMARY

A system and method for providing location information for communications through an access network in accordance with embodiments of the invention are disclosed. The system and method involve receiving a communication including a message from an origination device. The communication includes access point information and the message includes an identifier of the communication. The access point information from the communication is extracted and the access point information or geographic data based on the access point information is stored in a database. The message includes the identifier is sent to a destination device of the message. The storing of the access point information or the geographic data in the database enables the destination device to obtain the access point information or the geographic data using the identifier included in the message by querying the database.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 5 depicts a flow diagram of a method for providing location information for communications through an access network in accordance with an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
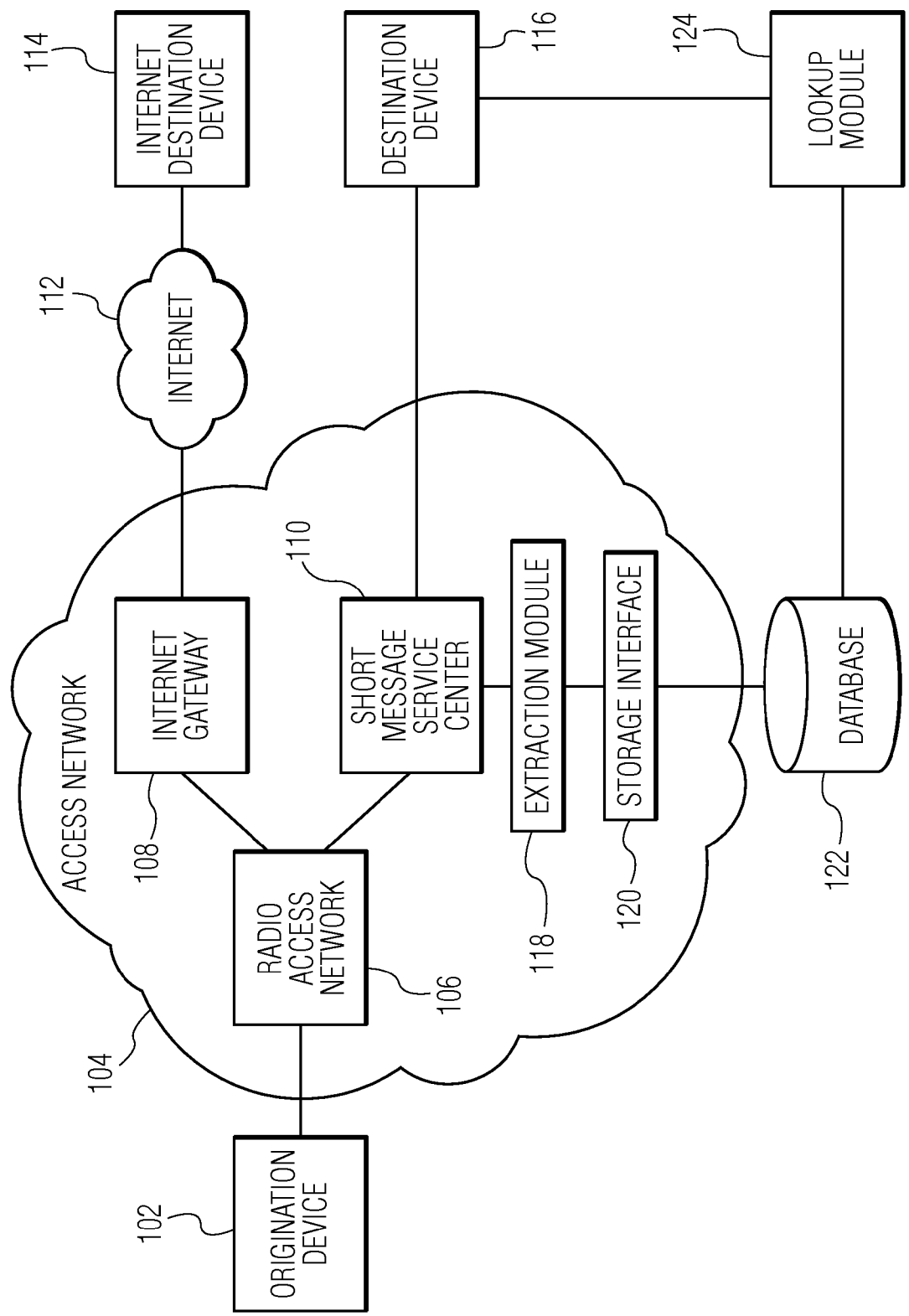
FIG. 1 depicts a schematic block diagram of a system for providing location information of an origination device sending a message to a destination device via an access network in accordance with an embodiment of the invention.

FIG. 1 depicts a system for providing location information for communications from an origination device 102 to a destination device 116 via an access network 104 in accordance with an embodiment of the invention. The origination device is connected to the destination device through the access network. The system of FIG. 1 may include more than one origination device and more than one destination device connected to each other through the access network.

The origination device 102 is a network enabled device including, without limitation, a mobile phone, smart phone, personal digital assistant (PDA), laptop, tablet, or personal computer (PC). In one embodiment, the origination device 102 is a wireless device that can support various different RF communications protocols, including without limitation, Global System for Mobile communications (GSM), Universal Mobile Telecommunications System (UMTS), Code Division Multiple Access (CDMA), Worldwide Interoperability for Microwave Access (WiMax) and communications protocols as defined by the $3^{rd}$ Generation Partnership Project (3GPP) or the $3^{rd}$ Generation Partnership Project 2 (3GPP2), 4G Long Term Evolution (LTE) and IEEE 802.16 standards bodies. Although some wireless communications protocols are identified herein, it should be understood that the present disclosure is not limited to the cited wireless communications protocols.

The destination device 116 is any device, application or system that is configured to receive electronic messages. In one embodiment, the destination device is a server, a mobile phone, a text alias, or any other device capable of receiving messages, such as, in a non-limiting example, text messages. In a particular embodiment, the destination device is a promotional shortcode system configured to receive responses to a promotion. The shortcode system may be a vote tallying system.

The access network 104 provides a communications interface for the origination device 102 to communicate with the destination device 116. Typical access networks include wireless service provider networks (e.g., that offer 3G, 4G and/or WiFi access) and ISPs (e.g., that offer dial-up, DSL, and cable modem access). A private enterprise network can also serve as the access network if origination devices within the private enterprise network can access other devices through the private enterprise network.

In one embodiment, the access network 104 is a wireless service provider network that provides a wireless communications interface for the origination device 102 (e.g., wireless device such as smartphone or tablet). In an embodiment, the wireless service provider network is accessible on a subscription basis (e.g., prepaid or post-paid) as is known in the field. In an embodiment, the wireless service provider network is a closed domain that is accessible only by subscribers (e.g. users of the origination device 102) that are in good standing with the operator of the wireless service provider network.

In the embodiment of FIG. 1, the wireless service provider network 104 includes a radio access network 106, an Internet gateway 108 and a short message service center 110. The radio access network includes one or more base stations to facilitate communications among wireless devices that are within a communication range of the base stations. Each base station has at least one RF transceiver and the base stations communicate with the wireless devices using RF communication signals. The radio access network facilitates network communications among multiple wireless devices within the same wireless service provider network and between wireless devices in other wireless service provider networks and provides interfaces to facilitate communications with other entities, such as a Public Switched Telephone Network (PSTN), a Wide Area Network (WAN), the Internet, Internet servers, hosts, etc., which are outside of the wireless service provider network. In an embodiment, the access network is operated by a single wireless service provider, such as, for example, a mobile phone carrier. In one embodiment, the wireless service provider has exclusive access to and control over the access network. In another embodiment (not illustrated) further access networks may be provided, each operated by a different wireless service provider.

Data signals communicated between the origination device 102 and the access network 104 include, but are not limited to, analog and/or digital RF signals (i.e., radio waves) for any type of communication mode, including text messaging, multimedia messaging, voice calling, and Internet browsing. The radio access network can support various different RF communications protocols, including without limitation, GSM, UMTS, CDMA, WiMax and communications protocols as defined by 3GPP, 3GPP2, or IEEE 802.16. Although some wireless communications protocols are identified herein, it should be understood that the present disclosure is not limited to the cited wireless communications protocols.

In the embodiment of FIG. 1, the system further includes an extraction module 118, a storage interface 120, a database 122 and a lookup module 124. The extraction module 118 is operatively coupled to the short message service center 110, and is configured to intercept or receive communications from the origination device 102 to the access network 104. In one embodiment, the extraction module is part of the access network and is implemented in hardware and/or software. In another embodiment, the extraction module is external to the access network and the communication from the origination device and the access network is sent from the access network to the extraction module. In a non-limiting example, the extraction module is implemented in a server. The storage interface 120 is connected between the extraction module and the database 122, and is responsible for storing location information or related information in the database. In one embodiment, the location information is access point information and/or geographic data (e.g., geographic information system (GIS) data) that is deduced using the access point information. In a non-limiting example, the access point information is an identifier of the cell (e.g., cell ID of a base station), an identifier of a WiFi access point, or an identifier of any other access point through which the originating device is connected to the access network. In some embodiments the database 122 may also store timestamp information. The timestamp information may be associated with when the communication is sent or intercepted, or when the information is stored in the database. When timestamp information is stored, the database can store location information for a finite time, such as a predetermined number of days, weeks or months. In embodiments where the destination device is a promotional shortcode system, the database 122 may store location information for the duration of a promotion at the promotional shortcode system. Storing timestamp information also allows the database to be queried for a particular period time, such as a specific day, week or month, a predetermined period to date, such as the month to date, or immediately preceding time period, such as the last twenty-four hours.

In one embodiment, the access point is a base station and is part of the radio access network 106. Thus, in this embodiment, the radio access network provides the access point information for communications from the origination device 102 to the destination device 116. The storage interface may be implemented in hardware and/or software and may be part of the access network or may be external to the access network. The storage interface may be implemented in a server, which may be the same server that includes the extraction module. Although the embodiment of FIG. 1 depicts the extraction module coupled to the short message service center, the extraction module is not limited to this embodiment and can additionally or alternatively be connected to any other component of the access network. For example, in one embodiment, the extraction module is connected to the internet gateway 108 and is configured to intercept communications between the origination device and an Internet destination device 114 connected to the access network via the Internet 112.

The Internet gateway 108 of the access network 104 provides a gateway for communications between the origination device 102 and other entities connected directly or indirectly to the access network, such as the Internet destination device 114. The Internet gateway may include a Serving General Packet Radio Service (GPRS) Support Node (SGSN) and a Gateway GPRS Support Node (GGSN). For example, the Internet gateway can be a Wireless Application Protocol (WAP) gateway that converts the WAP protocol used by the access network (such as a wireless service provider network) to the HTTP protocol used by the Internet. In an embodiment, the Internet gateway enables the wireless devices to access multimedia content, such as HTML, compact HTML (cHTML), and extensible HTML (xHTML), which is stored on Internet-connected hosts and/or servers. In this way, the access network provides access to the Internet for its subscribers.

The database 122 can be located in any storage device, which may be part of the access network or external to the access network 104. In a non-limiting example, the database may be located in a storage device of a server, which may be the same server that includes the extraction module 118 and/or the storage interface 120. In embodiments where there is more than one access network, the database may be located external to all access networks and can store location information of messages sent through at least two of the access networks.

The lookup module 124 is coupled to the database and is configured to allow the destination device 116 to retrieve the location information of the message. The lookup module may be implemented in software and/or hardware. In one embodiment, the lookup module may be implemented in a server, which may be the same server that includes the extraction module, the storage interface and/or the database. The lookup module is configured to allow a device (e.g., the destination device of the message) to enquire about the origination device from which the message originated. This enquiry may include a request to retrieve the location information associated with the message. In response, the lookup module searches the database for the requested location information and forwards the location information to the requesting device. In the embodiment in which only access point information, not geographic data, associated with messages are stored in the database, the lookup device may convert the access point information for the message into geographic data, such as a corresponding physical address, which is then provided to the requesting device. In one embodiment, the destination device is enabled to interact with the lookup module by using, for example, an application programming interface (API). The destination device is therefore enabled to retrieve the location information of the origination device, i.e., the access point information and/or the geographic data, from which the message originated.

In operation, the origination device 102 sends a message to the destination device 116 via the access network 104. The access network receives the message from the origination device and transmits the message and other information, such as the access point information, as a single communication through the access network. The access network then forwards the message to the destination device. When the message is forwarded to the destination device, the access point information contained in the communication is not transmitted with the message, and thus, is lost. In one embodiment, the access network is a mobile phone carrier and the origination device is a wireless device. In this embodiment, the mobile phone carrier has knowledge about the base station that was used to send a communication (including a message, such as an SMS) from the wireless device. However, the information about the base station (e.g. cell ID) in a typical access network is not transmitted along with the message and the destination device therefore has no knowledge about the base station from which the message originated. The base station information can be useful to deduce a location of the sender of the message, for example for use in demographic studies in response to a promotion or advertising campaign.

The access network 104, upon receiving the communication (including the access point information) from the origination device 102, extracts the access point information from the communication and enables the destination device 116 to receive the location information subsequent to receiving of the message. In particular, the extraction module 118 receives the communication and extracts the access point information included in the communication. The extraction module then sends the access point information to the storage interface 120. The storage interface stores the access point information (e.g., cell ID) and/or the geographic data (e.g., postal code such as a Zone Improvement Plan (ZIP) code) based on the access point information in the database 122.

After receiving the message, the destination device 116 or another device is able request the location information of the message, i.e., the access point information and/or the geographic data of the message, from the database 122 via the lookup module 124. In an embodiment, the requesting device sends a request to retrieve the location information associated with the message. The lookup module then retrieves the location information for the requested message from the database and relays the location information to the destination device 116.

Figure 2:
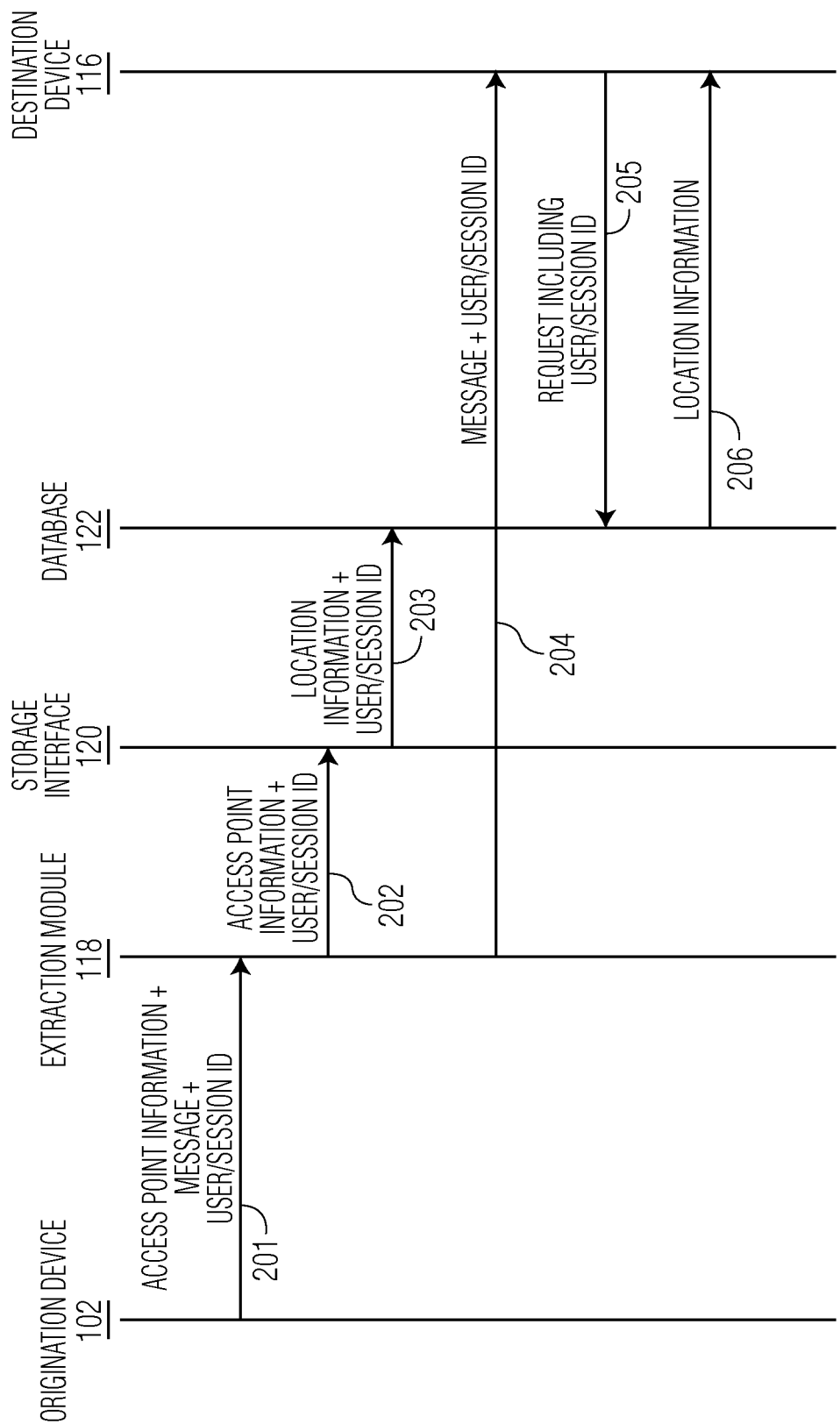
FIG. 2 depicts a schematic diagram of communications between a origination device and a destination device through an access network in accordance with an embodiment of the invention.

FIG. 2 depicts a schematic diagram of communications between an origination device 102 and a destination device 116 through the access network 104 in accordance with an embodiment of the invention. In the embodiment of FIG. 2, a first communication 201 is initiated between the origination device and the extraction module 118 of the access network. The first communication includes access point information (e.g., cell ID), a message (e.g., text of a short message service (SMS) text message) and an identifier of the origination device (e.g., International Mobile Subscriber Identity (IMSI) number, Mobile Subscriber Integrated Services Digital Network (MSISDN) number, and/or International Mobile Equipment Identity (IMEI) number). In an embodiment, the access point information is provided by an access point of the access network, such as a base station of the access network. In an embodiment, the identifier of the origination device may be a session ID.

In the embodiment of FIG. 2, after receiving the first communication, the extraction module extracts the access point information and, in a second communication 202, the extraction module forwards the access point information to the storage interface 120 of the access network. In one embodiment, the second communication also includes the origination device's identifier or a session ID identifying the first communication. In one embodiment, the storage interface converts the access point information into geographic data identifying a physical region such as, in a non-limiting example, a postal code, county, city, GPS coordinates or any other information defining a location of the origination device 102. The geographic data is obtained, for example, by querying a server that has information about the physical location that the access point information represents. In one embodiment, the access point information is a cell ID of an access network's base station that received the first communication from the origination device and transferred the first communication to the extraction module. In this embodiment, the physical location of the cell ID can be obtained from a server of the access network that has a list of geographic data corresponding to different base station's cell IDs. The storage interface then sends location information of the origination device to the database 122 in a third communication 203, and stores the location information in the database. The location information may include the access point information and/or the geographic data or any other location information of the origination device based on the access point information. The third communication may also contain the origination device's identifier or the session ID. The extraction module sends the message from the first communication to the destination device in a fourth communication 204. In one embodiment, the fourth communication includes the origination device's identifier and/or the session ID. The destination device is able to request the location information of the origination device, e.g., the access point information and/or geographic data, from the database by sending a request including the origination device's identifier or the session ID to the database in a fifth communication 205. Upon receiving the request from the destination device, the database performs a lookup of the location information for the origination device given by the origination device's identifier or for the session given by the session ID. The result of the lookup (e.g., the location information including the access point information and/or geographic data) is then sent to the destination device in a sixth communication 206.

It should be understood that the order of the first to sixth communication as depicted in FIG. 2 is purely presented for illustrative purposes and can be rearranged if desired. For example, the fourth communication 204 may occur before the second communication 202.

Figure 3:
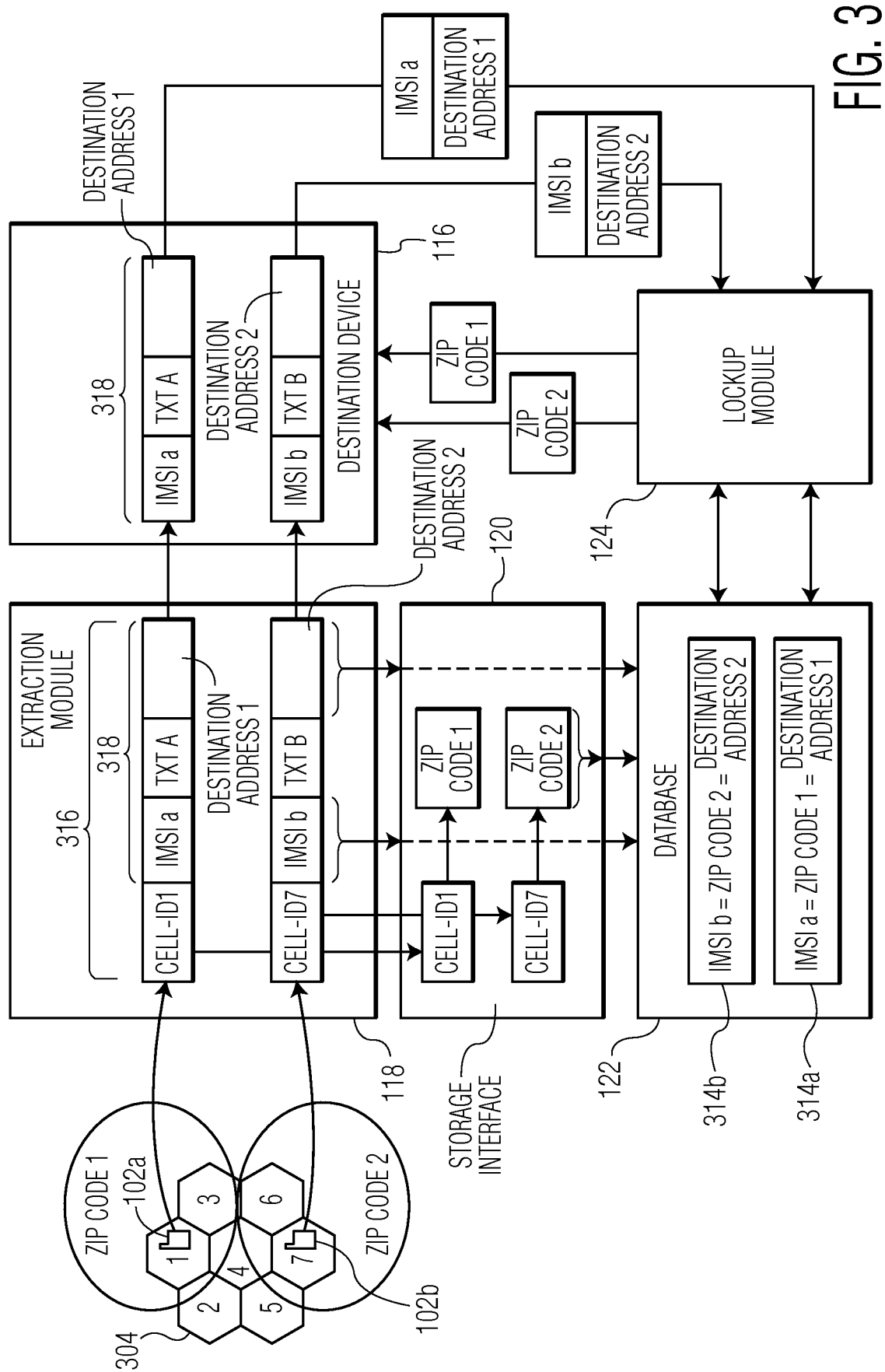
FIG. 3 depicts a schematic diagram of information contained in communications between an origination device and a destination device through an access network in accordance with an embodiment of the invention.

FIG. 3 depicts a schematic diagram of information contained in communications between an origination device 102 and a destination device 116 through an access network 104 in accordance with an embodiment of the invention. FIG. 3 will now be described with respect to a mobile carrier's access network and origination devices connected to destination devices through the access network and base stations having particular cell IDs. However, the embodiments described herein are not limited to mobile carrier's access networks and wireless devices. In the embodiment of FIG. 3, a first origination device 102a is within a first location of a base station having cell ID 1. A second origination device 102b is located within a second location covered by a base station with cell ID 7. In this exemplary embodiment, the first location is within an area represented by a first ZIP code 302a and the second location is within an area represented by a second ZIP code 302b. Although cell IDs 304 are depicted to be non-overlapping, the depiction is purely illustrative and the areas covered by each base station (corresponding to each cell ID) typically have at least some overlap. Although each origination device is typically connected to only one base station at a time, the origination devices can pick up signals from more than one base station at a time (e.g., before a call or other transmission is initiated) and resolve the location of the origination device by multilateration or trilateration. In one embodiment, the origination device uses signals from two or more base stations to perform time difference of flight (TDOF) measurements in order to determine the position of the origination device.

In the embodiment of FIG. 3, the origination device 102a establishes a first communication 316 with the extraction module 118 through the access network. In a non-limiting example, the first communication includes an SMS message 318 including an IMSI of the origination device 102a (IMSI a), a body of the message (TXT A) and a destination address 1 (e.g., shortcode of a promotional campaign). The first communication further includes the cell ID 1, which is typically transmitted along with communications through the access network. In one embodiment, the access network 104 receives location information based on TDOF measurements along with the first communication instead of or along with the cell ID 1. Although the following description of FIG. 3 is related to cell IDs, it is not limited to cell IDs, and other access point information may be used. FIG. 3 further depicts a second communication from the second origination device 102b. The second communication includes the cell ID 7, an IMSI b of the origination device 102b, a body of the message TXT B, and a destination address 2.

After receiving the first communication, the extraction module 118 sends the IMSI a, the TXT A and the destination address 1 of the first communication to the destination device given by the destination address 1. Similarly, the extraction module sends the IMSI b, the TXT B and the destination address 2 to the destination device given by the destination address 2. In one embodiment, the destination address 1 and the destination address 2 are two different short code telephonic numbers, each being received by a different or by the same entity. In the embodiment of FIG. 3, the destination address 1 and the destination address 2 both reach the same destination device 116.

The extraction module further extracts the cell ID 1 and the cell ID 2 from the first communication and the second communication, respectively, and the extraction module sends the cell ID 1 and the cell ID 2 to the storage interface 120. In one embodiment, the storage interface stores the cell ID 1 and cell ID 2 in the database 122. In another embodiment, as depicted in FIG. 3, the storage interface converts the cell ID 1 into the corresponding ZIP code 1 and converts the cell ID 2 into the corresponding ZIP code 2 and stores the ZIP code 1 and the ZIP code 2 in the database. The extraction module 118 also sends the IMSI a and IMSI b, and the destination address 1 and destination address 2 to the database, either directly or via the storage interface.

The database 122 therefore stores database entries 314a and 314b including the IMSI, ZIP code and destination address for the first communication and the second communication. In one embodiment, instead of storing the IMSI in the database, the communications are assigned session IDs and the session IDs are stored in the database. The session Ids are then also sent to the destination device.

In the embodiment of FIG. 3, the destination device 116 has access to the database 122 through the lookup module 124. The destination device is able to use the IMSI a and the destination address 1 (or the corresponding session ID) to retrieve the ZIP code 1 stored in the data entry 314a of the database by making a request to the lookup module. Similarly, the destination device can use the IMSI b and the destination address 2 (or the corresponding session ID) to retrieve ZIP code 2 from the data entry 314b via the lookup module. The appropriate ZIP code for the request from the destination device can be found by searching the data entries and comparing request parameters including the IMSI and the destination address to the IMSI and destination addresses in the data base entries. If more than one data entry matches the request parameters (e.g., when the origination device sends a first SMS from a first location and a second SMS from a second location), all matching ZIP codes may be returned to the destination device that performed the request. In one embodiment, the database is configured to hold the data entry for given period of time or until the data entry is retrieved. The ZIP code information can be used by the destination device, for example, to perform demographic studies of the geographic locations from which responses to a promotion or advertising campaign are received. In one embodiment, the destination device interacts with the database through email, an IM session control function or an API.

In the embodiment in which cell IDs, not ZIP codes, are stored in the database 122, the lookup device 124 first finds the matching cell ID in the database for a request from the destination device 116. The lookup device then uses the matching cell ID to converts the cell ID into the corresponding ZIP code, which is then transmitted to the destination device.

In further embodiments in which the destination device is a promotional shortcode system, additional information can be stored in the database 122. This additional information can include at least one of the shortcode itself, a description of the promotion or service associated with the shortcode and the owner of the shortcode. When this information is included in the database 122, a query may use that information to return aggregated location information for a particular shortcode or owner of a shortcode. This may be more efficient than many separate lookups for every response to the promotion.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital versatile disk (DVD).

Figure 4:
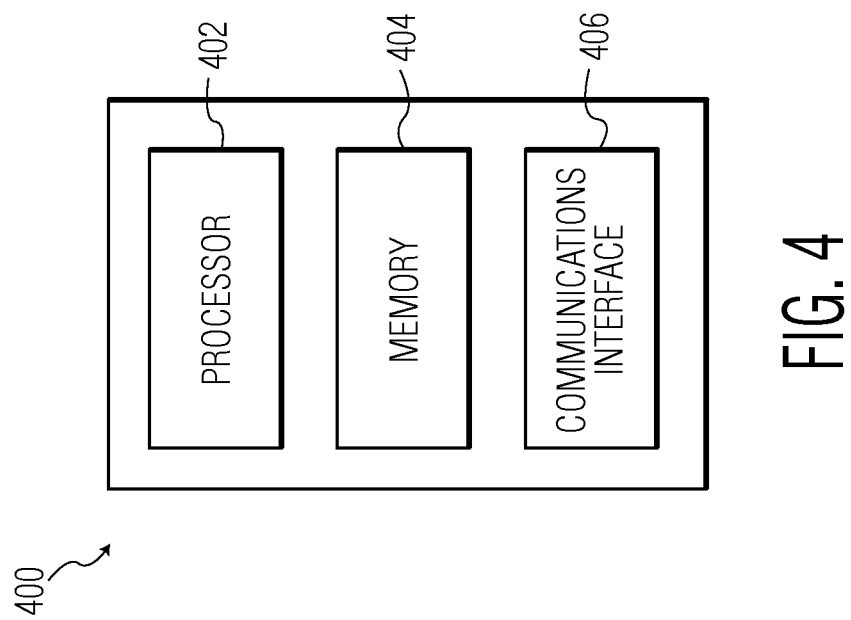
FIG. 4 depicts a computer that includes a processor, memory, and a communications interface.

In an embodiment, the functionality of at least some of the components depicted in FIGS. 1-3 is performed by a computer that executes computer readable instructions. FIG. 4 depicts a computer 400 that includes a processor 402, memory 404, and a communications interface 406. For example, the extraction module 118, the storage interface 120 and/or the database 122 may be implemented in hardware and/or software and are, in a non-limiting example, implemented in a server, such as a file server, database server, web server or any other type of dedicated or shared server. The processor may include a multifunction processor and/or an application-specific processor. Examples of processors include the PowerPC™ family of processors by IBM and the x86 family of processors by Intel. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

FIG. 5 depicts a flow diagram of a method for providing location information for communications through an access network in accordance with an embodiment of the invention. At block 502, a communication including a message from an origination device is received. The communication includes access point information and the message includes an identifier of the communication. Next, at block 504, the access point information is extracted from the communication. Next, at block 506, the access point information or geographic data based on the access point information is stored in a database. At block 508, the message including the identifier is sent to a destination device. The storing of the access point information or the geographic data in the database enables the destination device to obtain the access point information or the geographic data from the database using the identifier.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for providing location information for communications comprising, at a server system comprising a processor and memory:

receiving a communication including a message from an origination device to a destination device separate from the server system, the communication including data indicative of a geographic location, the message including an identifier;

extracting the data from the communication;

storing the identifier and location information in a database, wherein the location information relates to a geographic location and is based at least in part on the data; and forwarding the message including the identifier to the destination device;

wherein storing the identifier and the location information in the database enables the destination device to obtain the location information using the identifier.

2. The method of claim 1 further comprising:
receiving a request from the destination device to obtain the location information, the request including the identifier;
looking up the location information in the database using the identifier; and
sending the location information to the destination device.

3. The method of claim 1, wherein the data includes an access point identifier.

4. The method of claim 3 further comprising, at the server system, converting the access point identifier to the location information for storage in the database.

5. The method of claim 1, further comprising storing timestamp information in the database, wherein the timestamp information is associated with the location information.

6. The method of claim 5, wherein the timestamp information is used to allow location data to be queried by the destination device for a predetermined period.

7. A system for providing location information for communications, the system comprising:
a server system comprising a processor and memory, configured to:
receive a communication including a message from an origination device to a destination device separate from the server system, the communication including data indicative of a geographic location, the message including an identifier;
extract the data from the communication;
store in a database the identifier and the location information; and
forward the message including the identifier to the destination device;
wherein storage of the identifier and the location information enables the destination device to obtain the location information using the identifier.

8. The system of claim 7, wherein the server system is further configured to:
receive a request from the destination device to obtain the location information, the request including the identifier;
look up the location information in the database using the identifier; and
send the location information to the destination device.

9. The system of claim 7, wherein the data includes an access point identifier.

10. The system of claim 9, wherein the server system is further configured to:
convert the access point identifier to the location information for storage in the database.

11. The system of claim 7, wherein the server system is further configured to:
store timestamp information in the database, the timestamp information being associated with the location information.

12. The system of claim 11, wherein the server system is further configured to:
use the timestamp information to allow the location data information to be queried by the destination device for a predetermined period.

13. A non-transitory computer-readable medium comprising instructions that, when executed by a processor of a server system, instruct the processor to:
receive a communication including a message from an origination device to a destination device separate from the server system, the communication including data indicative of a geographic location, the message including an identifier;
extract the data from the communication;
store the identifier and location information in a database, wherein the location information relates to a geographic location and is based at least in part on the data; and
forward the message including the identifier to the destination device;
wherein storing the identifier and the location information in the database enables the destination device to obtain the location information using the identifier.

14. The non-transitory computer-readable medium of claim 13, wherein the instructions, when executed by the processor of the server system, instruct the processor to:
receive a request from the destination device to obtain the location information, the request including the identifier;
look up the location information in the database using the identifier; and
send the location information to the destination device.

15. The non-transitory computer-readable medium of claim 13, wherein the data includes an access point identifier.

16. The non-transitory computer-readable medium of claim 15, wherein the instructions, when executed by the processor of the server system, instruct the processor to:
convert the access point identifier to the location information for storage in the database.

17. The non-transitory computer-readable medium of claim 13, wherein the instructions, when executed by the processor of the server system, instruct the processor to:
store timestamp information in the database, wherein the timestamp information is associated with the location information.

18. The non-transitory computer-readable medium of claim 17, wherein the instructions, when executed by the processor of the server system, instruct the processor to:
use the timestamp information to allow location data to be queried by the destination device for a predetermined period.

* * * * *